United States Patent [19]
Williams et al.

[11] Patent Number: 6,150,005
[45] Date of Patent: Nov. 21, 2000

[54] SYNTHETIC PAPER

[75] Inventors: Richard C. Williams, Erie, Pa.; Gary H. Knauf, Bear Creek, Wis.

[73] Assignee: International Paper Company, Purchase, N.Y.

[21] Appl. No.: 08/839,654

[22] Filed: Apr. 15, 1997

[51] Int. Cl.[7] ..................................................... B32B 27/00
[52] U.S. Cl. .................. 428/141; 428/297.4; 428/297.7; 428/300.7; 442/394; 442/398; 442/412; 442/409; 442/50; 442/58
[58] Field of Search ..................................... 442/394, 398, 442/412, 401, 409, 50, 58; 428/297.4, 297.7, 141, 172, 196

[56] References Cited

U.S. PATENT DOCUMENTS 4,647,497  3/1987  Weeks ....................................... 428/394
5,494,745  2/1996  Vander Velden et al. .............. 428/354

FOREIGN PATENT DOCUMENTS 62-215091  9/1987  Japan .

*Primary Examiner*—Elizabeth M. Cole
*Attorney, Agent, or Firm*—Luedecka, Neely, & Graham, P.C.

[57] ABSTRACT

The specification discloses a synthetic paper composite web containing a relatively smooth, dense top layer comprising synthetic pulp, a relatively soft non-woven base layer of synthetic filaments and a low density polyolefin film layer substantially continuously interbonding the top and base layers together along their interface. An advantage of the composite of the invention is that it is substantially weather resistant, strong, recyclable and compatible with a range of inks and printing systems.

18 Claims, 4 Drawing Sheets

SYNTHETIC PAPER

FIELD OF THE INVENTION

The present invention relates to synthetic paper webs for use in packaging and for making signs and displays.

BACKGROUND

Synthetic films are used for a variety of applications including packaging, liners, signs, banners and the like. Many of these applications require high strength and weather resistance which has led to widespread use of films based on polyvinyl chloride and similar materials. However, these materials are relatively expensive and not easily recyclable.

Cellulosic paper products are not generally suitable for applications requiring weatherability, durability and strength. Paper containing synthetic fibers has been provided for specific applications such as envelopes, food liners and the like, but cellulosic/synthetic fiber blends often have compromised strength or weatherability for outdoor applications.

A composite packaging material made of cellulosic and synthetic materials is described in U.S. Pat. No. 5,128,182 to Bunker et al. The composite includes a first layer of absorbent material, a second layer of printable material and a water vapor impermeable polymer layer between the first and second layers which is discontinuously bonded to at least one of the layers in order to form air pockets between the one layer and the polymer layer. According to the description, the absorbent layer is composed primarily of cellulosic fibers and the composite contains a printable outer layer which may be a machine glazed or coated paper. While the composite may be suitable as a food wrap for heat retention purposes, it is not suitable for making outdoor signs and banners because of its cellulosic fiber content.

Accordingly, it is an object of the invention to provide an improved synthetic paper composition.

Another object of the invention is to provide a synthetic paper composite which has improved strength.

A further object of the invention is to provide a synthetic paper made from recyclable materials having the weather resistance of polymeric films and good printability.

An additional object of the invention is to provide a method for producing a laminated synthetic paper product which exhibits improved properties.

SUMMARY OF THE INVENTION

With regard to the above and other objects, the invention provides a synthetic paper composite web consisting essentially of a top layer comprising a synthetic pulp, a base non-woven layer comprising randomly oriented interbonded polymeric filaments and a low density polyolefin film layer disposed between the top and base layers. The film layer substantially continuously interbonds the top and base layers together adjacent top and base layer film interfaces on opposite surfaces of the film layer.

According to another aspect of the invention, a method is provided for making a synthetic paper composite web which comprises disposing a low density polyolefin film layer between a top layer comprising a synthetic pulp and a base non-woven layer comprising randomly oriented interbonded synthetic polymeric filaments, and substantially continuously interbonding the film to the adjacent surfaces of the top and base layers.

In accordance with a further aspect of the invention, the base layer has a basis weight in the range of from about 10 to about 30 lbs/3000 ft$^2$, a caliper in the range of from about 10 to about 15 mils and the filaments therein consist essentially of polypropylene. In contrast, the top layer has a basis weight in the range of from about 35 to about 60 lbs/3000 ft$^2$ and a caliper of from about 5 to about 10 mils. The fibrous component of the top layer is comprised principally of chopped polyethylene fibers; however, the top layer has a substantially smooth outer surface and a relatively closed structure contrasted with the base layer which has a soft, textured outer surface and a lighter more open structure. Prior to combining the base layer with the film the base layer is preferably point bonded on an embossed heated nip roll to melt and fixedly bond the filaments to one another and to provide a pattern of small closely spaced concavities on one of its surfaces. The surface containing the concavities is continuously interbonded with the film which, with the top layer, deforms into the concavities in the course of bonding the base layer and film together.

A particular advantage of the synthetic paper web of the invention is that the composite may be made entirely from one or more synthetic or polymeric materials without adhesives which promotes recyclability. Because of its laminate construction, the composite possesses a tear strength significantly higher than that of the top synthetic pulp layer alone. For example, the top layer by itself typically has a tear strength in the machine direction of about 23 to about 30 grams and in the cross direction of about 27 to about 35 grams, whereas the composite has a tear strength in the machine direction of at least about 580 grams and in the cross direction of at least about 600 grams. Furthermore, the composite is substantially weather resistant, and the composite can be sold at about one quarter the cost of a vinyl web.

A further advantage of the synthetic paper of the invention is that the top layer readily accepts inks and coatings making the composite useful with a wide variety of printers, especially ink jet printers. The printed synthetic paper compositions of the invention surprisingly exhibit vibrant colors when printed.

BRIEF DESCRIPTION OF THE DRAWINGS

The above and other features and advantages of the invention will now be further described in the following detailed description of preferred embodiments of the invention considered in conjunction with the drawings in which.

DETAILED DESCRIPTION OF THE INVENTION

Figure 1:
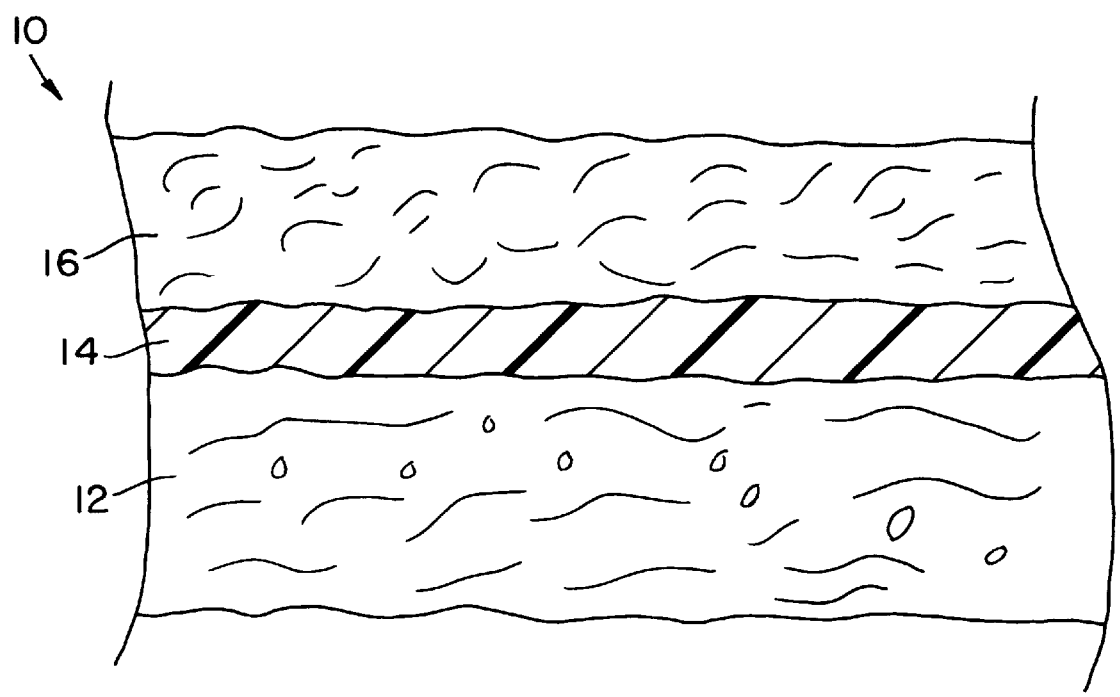
FIG. 1 is a diagrammatic view, in cross section, illustrating layers of a synthetic paper composite web according to a preferred embodiment of the invention.

The invention provides a synthetic paper composite web having improved aesthetic and functional properties for a range of useful applications including, but not limited to, packaging, signage and displays, and is especially advantageous for its strength and weatherability. The composite web is a multi-layer structure which combines layers of synthetic materials in a manner which achieves very desirable objectives in these applications by economical manufacturing methods employing existing production techniques.

In general, the composite includes three layers. With reference to the diagrammatic illustration of FIG. 1 and for purposes of simplicity, layer 12 of synthetic paper composite 10 is referred to herein as the base layer, layer 14 is referred to herein as the bond layer and layer 16 is referred to herein as the top layer. However, it will be understood that no particular orientation or order is intended by these designations and in some applications or configurations base layer 12 may be vertically above or horizontally disposed relative to top layer 16 and either base layer 12 or top layer 16 may be exterior or interior to an underlying substrate or support, onto or adjacent which the other layer is disposed. Also, other layers/coatings can be applied onto layers 12, 16.

Figure 2:
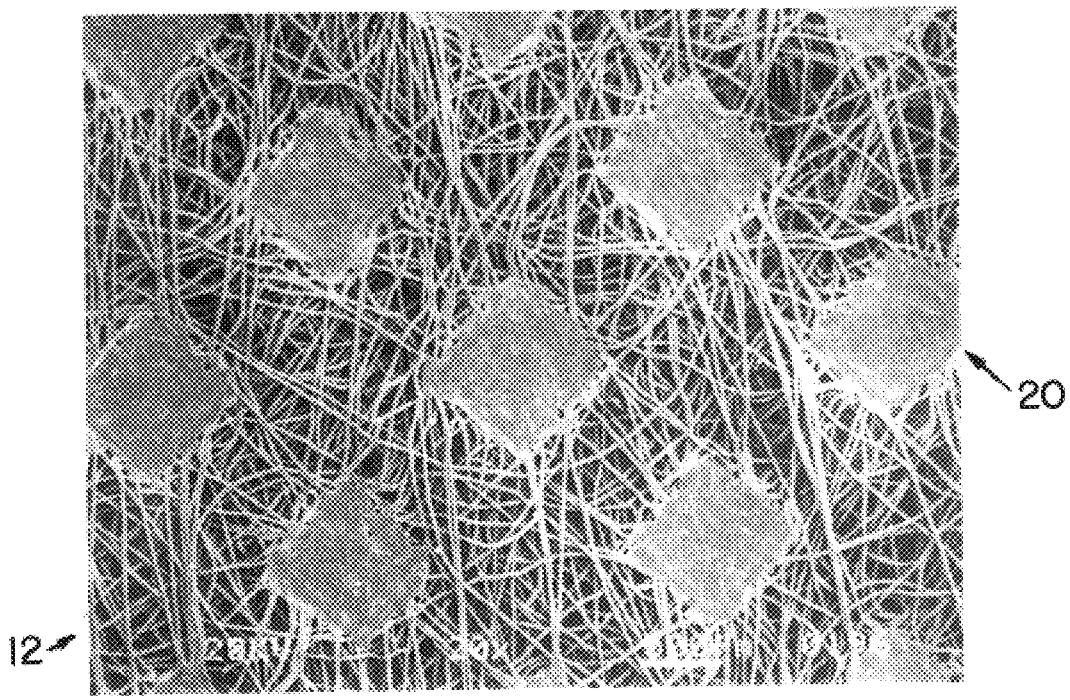
FIG. 2 is a photomicrograph of the surface of a non-woven layer of a synthetic paper composite web corresponding to the composite of FIG. 1 magnified 20 times.
Figure 3:
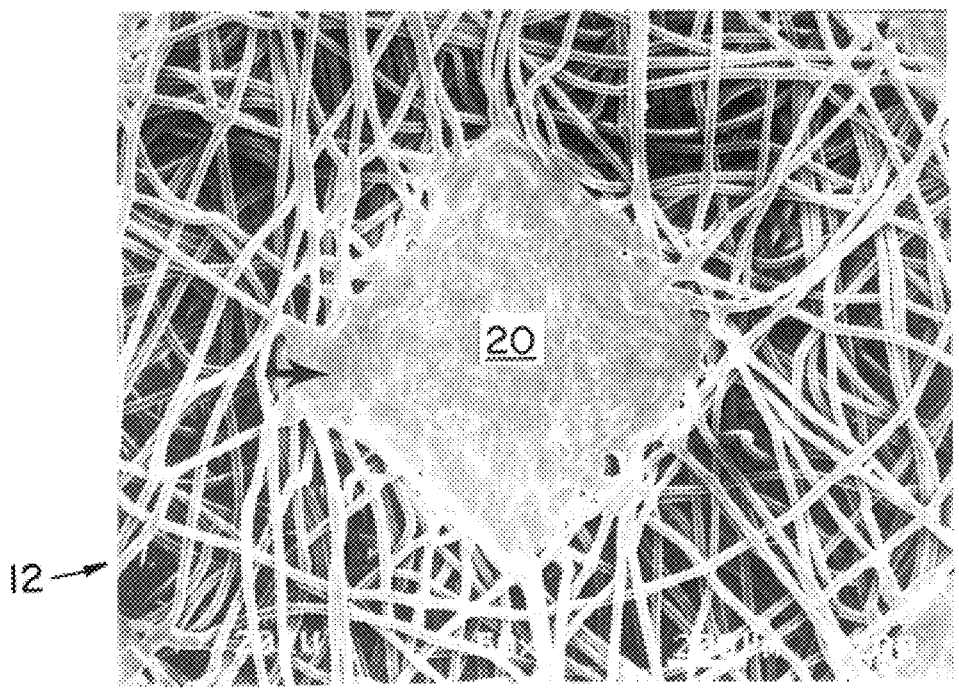
FIG. 3 is a photomicrograph of the layer of FIG. 2 magnified 50 times.

With reference to FIGS. 2 and 3, base layer 12 is preferably a synthetic fibrous material having a multiplicity of randomly oriented interbonded and overlapping elongate synthetic fibers or filaments of substantially uniform diameter arranged in a relatively wide, flat and thin open structure having a relatively uniform thickness across and along the web. Such materials are conventionally referred to as "nonwoven" webs.

The non-woven web for base layer 12 may be made by conventional techniques such as by a spunbond or melt-blow process, or may be a web composite made of spunbond and meltblown fibers, using a fiber-producing extruder and a web forming apparatus. Such an extruder typically contains spinning orifices in a spinnerette which form relatively long unitary filaments having a distinct and typically uniform cross sectional diameter along substantially the entire length of the filaments.

In a typical spunbond process, a polymeric composition which may contain one or more polymeric materials, processing aids, plasticizers and the like is fed to a hopper, then to an extruder and metering pump and to a spin box wherein filaments are spun through a moving spinnerette onto a continuous foraminous surface such as a belt, plate or screen. The spinnerette contains openings arranged in one or more rows to form a curtain of filaments which is directed to a quench chamber. In the quench chamber the filaments are contacted with air or other cooling fluid under a low pressure. As the filament curtain is quenched it is directed through a narrow chamber at the lower end of the quench chamber whereby the cooling fluid attains a high velocity. After exiting the quench chamber, the filaments are collected on the moving foraminous surface such as an endless screen or belt to form a non-woven web.

During the spinning operation, the spinnerette is moving across the collecting surface so that the filaments extruded from the spinnerette are laid down in random orientation on the collecting surface. As the filaments are deposited, they cool and solidify into a fibrous web. Because the filaments are still in a softened form when they are extruded from the spinnerette, the fibers tend to bond to one another at their overlaps and intersections. Additional bonding may be achieved by use of binders or by heating and pressing the fibrous web using an embossed, heated nip roll in order to melt the fibers together and to modify the texture of the web.

Methods for making spunbond fabrics are described in U.S. Pat. No. 3,692,618 to Dorschner et al, U.S. Pat. Nos. 3,338,992 and 3,341,394 to Kinney, U.S. Pat. No. 3,989,788 to Estes, Jr. et al. and U.S. Pat. No. 4,340,563 to Appel et al., incorporated herein by reference as if fully set forth.

In a melt-blown process, a polymeric composition is fed to a hopper, then to an extruder and metering pump which feeds a spin box. The spin box contains a spinnerette and a source of high pressure fluid such as air to surround and entrain the polymeric material and to educt the filaments from the orifices of the spinnerette. As the filaments are educted, they are deposited on a moving foraminous surface such as a belt or screen. The high pressure fluid spreads the polymeric stream and forms microfibers which are randomly deposited on the moving web to form a melt-blown layer of fibers. Methods for making melt-blown webs are known in the art and are described in U.S. Pat. No. 3,849,241 to Buntin et al., incorporated herein by reference as if fully set forth.

As illustrated in FIGS. 2 and 3, a preferred structure for base layer 12 is a one to one and one-half ounce per square yard spunbond material which includes on at least one surface a pattern of small depressed areas or concavities 20 where the fibers have been melted to one another by a point bonding technique in order to provide a textured surface. While diamond-shaped areas are shown in FIGS. 1 and 2, it will be recognized that any suitably shaped area or embossing technique may be used to provide such point bonding to yield a textured surface for the base layer 12.

The areas 20 preferably comprise about 19% of the total surface area and have dimensions which preferably range from about 1 to about 1.25 millimeters in diameter, from about 0.5 to about 0.8 millimeters in depth and are spaced apart about 1 millimeter resulting in about 0.34 point bonds per $mm^2$. However, it will be understood that the particular dimensions, shape and arrangement of areas 20 can vary within wide limits.

An important aspect of the invention is the texture, drape and hand contributed to the composite 10 by base layer 12. As depicted in FIGS. 2 and 3, base layer 12 has a relatively open pore structure which in conjunction with the nature and dimension of the fibers of layer 12 confers a light, soft feel to the exterior surface of the composite 10 adjacent base layer 12 which is distinctly different from that of top layer 16.

Thus, the fibers for base layer preferably have a denier in the range of from about 2.5 to about 3.0 denier per filament and are combined in such a way that the resulting nonwoven web has a caliper or thickness ranging from about 10 to about 15 mils and a weight in the range of from about 10 to about 30 lbs/3000 $ft^2$ within this range of thicknesses. Most preferably, the fibers in base layer 12 have a relatively uniform denier in the above range, the average thickness of layer 12 is about 12.5 mils and the weight of layer 12 is about 15 to about 25 lbs/3000 $ft^2$.

The fibers used to make base layer 12 may be selected from a range of synthetic fibers including, but not limited to, polyolefin, polyester and polyamides and may include various additives such as flame retardants, UV stabilizers, rheology, tack or wetting/dewetting agents and pigments. The fibers may also contain, include or be used with various binders, natural cellulosic fibers sizing or bonding agents.

An especially preferred fiber for making the fibers of base layer 12 is polypropylene, most preferably a polypropylene having a melt flow rate of about 30 to about 40 suitably supplied by the polypropylene homopolymer material available from Himont, Inc. of Wilmington, Del. under the trade designation PRO-FAX PP-PH-805 or from the Exxon Corporation of Flemington, N.J. under the trade designation ESCORENE PP-3445.

Figure 4:
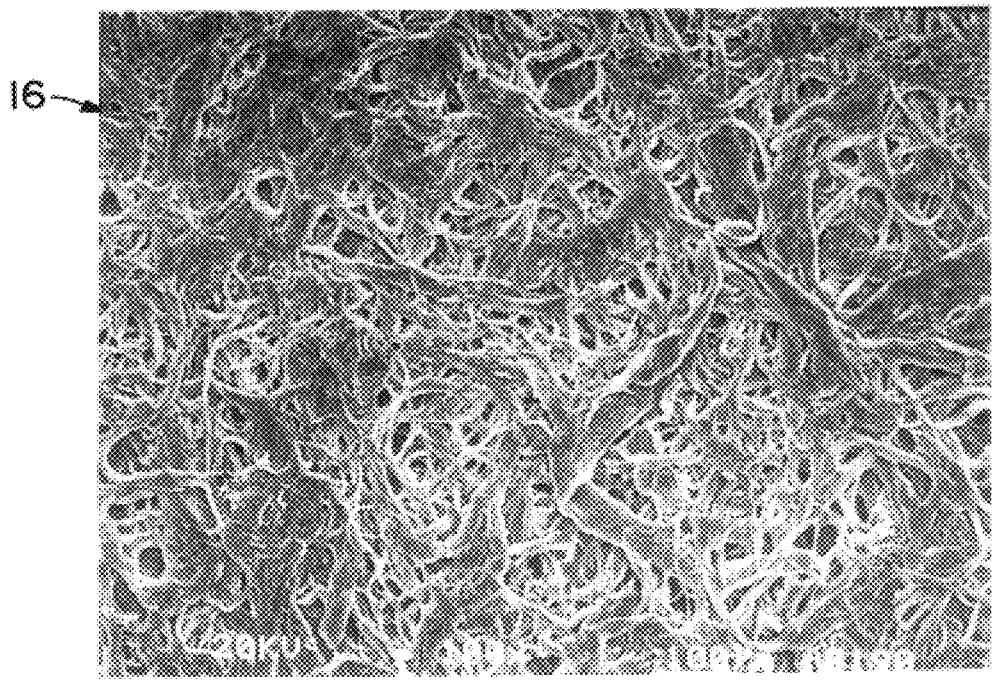
FIG. 4 is a photomicrograph of the surface of a synthetic pulp layer of a synthetic composite web corresponding to the composite of FIG. 1 magnified 100 times.
Figure 5:
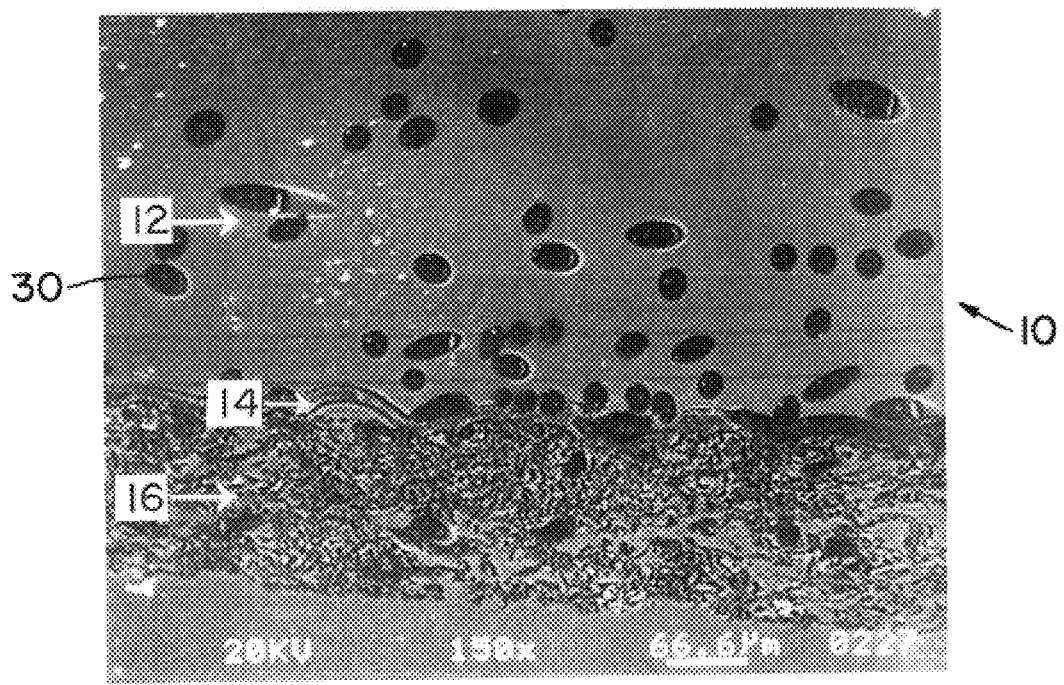
FIG. 5 is a photomicrograph of a cross-section of the FIGS. 2–4 composite showing the non-woven layer of FIGS. 2–3 continuously interbonded with the pulp layer of FIG. 4 by an intermediate film of low density polyethylene.

Top layer 16 has a distinctly different character relative to base layer 12 and contributes importantly to the novel and advantageous properties of the composite 10. As can be seen in FIGS. 4 and 5, top layer 16 is characterized as a relatively compact or dense network of strands of flattened or compressed synthetic fibrous pulp which defines a relatively smooth outer surface as distinguished from the outer surface of base layer 12 (FIG. 2). Thus, the outer surface of composite 10 defined by the top layer 16 exhibits a relatively smooth, paper-like texture while the outer surface of composite 10 defined by the base layer 12 exhibits a relatively soft, light and fuzzy texture.

A preferred method for making the top layer 16 is a wet-laid process wherein an aqueous slurry of synthetic fiber pulp is laid down in a relatively uniform thickness onto a moving foraminous support where the water is drained/drawn from the slurry leaving the fibers in a wet matt of substantially uniform thickness. A polyvinyl alcohol sizing agent is added to the matt, and the matt is then dried and pressed/heated to flatten/deform the fibers into an interbonded network as shown in FIG. 4 where considerable deformation/coalescence of the fibrous material can be seen. A particularly preferred method for making top layer 16 is described in U.S. Pat. No. 5,616,384 to Goettmann et al., the disclosure of which is incorporated herein by reference as if fully set forth.

The fibers for use in making top layer 16 may be selected from a range of synthetic fibers including, but not limited to, polyethylene, polypropylene, polyesters and polyamides. The fibers of the top layer 16 may also contain or be supplied with various additives such as flame retardants, UV stabilizers, rheology, tack or wetting agents and pigments, and the layer 16 may include natural cellulosic fibers, fillers and retention aids of various types, charge modifiers and binders.

An especially preferred fiber source for producing top layer 16 is chopped polyethylene having an average diameter in the range of from about 12 to about 18 microns with an average length of from about 0.7 to about 1.2 millimeters. The fibers are preferably slurried in water to a consistency of about 1.5% fiber in the machine chest and applied from this slurry onto a fourdrinear wire and made into a web from there in a conventional manner with sufficient pressing/heating to consolidate the fibers as aforesaid.

It is preferred that the layer made from synthetic pulp contain a substantial portion of polyethylene fibers, from about 5 to about 15% by weight polypropylene staple fibers and from about 1 to about 8% by weight polyvinyl alcohol fibers as a binder. By "substantial portion" is meant more than about 75% by weight polyethylene fibers. The polypropylene staple fibers typically have an average size ranging from about 2.0 to about 2.4 denier per filament and an average length ranging from about 8 to about 12 millimeters and the polyvinyl alcohol fibers have an average size ranging from about 1.8 to about 2.2 denier per filament and an average length of about 3 to about 8 millimeters.

Preferably, the resulting web for use in top layer 16 has a thickness or caliper in the range of from about 6 to about 8.5 mils, most preferably about 6.5 mils. The weight of top layer is preferably in the range of from about 38 to about 55 lbs/3000 ft$^2$, and is most preferably about 43 to about 51 lbs/3000 ft$^2$.

The top layer 16 preferably has a Sheffield smoothness in the range of from about 190 to about 235. Most preferably, the top layer has a Sheffield smoothness of about 200.

For printing applications such as ink jet printing, it is preferred that the outer surface of the top layer 16 be coated with a material to promote or enhance the printability of the composite. Accordingly, the top layer 16 may contain from about 1 to about 15 pounds per 3000 square feet of a clay coating for flexographic and offset printing and the various coatings used to promote inkjet or laser jet printing. The coating may be applied to the outer surface of the top layer 16 by any suitable coating technique such as rod coating, roll coating, and the like before or after preparing the composite web. It is preferred, however, to coat the outer surface of the top layer 16 after the composite is prepared due to the heat and pressure which may be applied to the composite during the lamination process. The coatings may be applied by spray coating, rod coating, and the like which provide coating weights in the range of from about 2 to about 5 pounds per 3000 ft$^2$.

Bond layer 14 disposed between top layer 16 and base layer 12 achieves a substantially continuous bond between the interior surfaces of the two layers 12, 16 to limit delamination or separation of the layers. It is a feature of the invention that bond layer 14 in combination with the other layers 12, 16 provides an overall relatively soft, drapable feel to the composite 10. This is accomplished by employing as the bond layer a material which is bondable with the structures of layers 12, 16 to secure them together while promoting the desired hand and texture. A preferred material for this purpose is a low density polyolefin which when placed in physical contact with the material of layers 12, 16 at an elevated temperature bonds/interfuses therewith sufficient to form an integral composite which resists delamination of layers 12, 16 from each other.

As shown in FIG. 5, bond layer 14 is interbonded on its opposed surfaces to fibers from the adjacent layers 12, 16, which interbonding is preferably substantially continuous over the entire interior surface of layers 12,16.

The low density polyolefin used to produce the polyolefin layer of the composite may be in the form of a film, particulate, spray, extrusion emulsion or the like and preferably has a softening point ranging from about 90° to about 125° C. A particularly preferred low density polyolefin is a low density polyethylene (LDPE). The polyolefin film layer preferably has a basis weight ranging from about 5 to about 15 lbs/3000 ft.$^2$ and a relatively uniform thickness ranging from about 0.2 to about 1 mil.

A preferred method for combining layers 12, 14 and 16 to produce the composite 10 is to initially extrude a low density polyolefin sheet at a temperature ranging from about 300° to about 320° C. onto the top layer 16 at an average line speed of about 700 feet per minute. The base layer 12 is applied to the polyolefin layer 14 immediately after the polyolefin layer 14 is extruded onto the top layer 16; and the entire composite is immediately cooled on a chill roll before any substantial melting of the top layer 16 or base layer 12 occurs.

During the bonding process, the extruded sheet of polyolefin interfuses with fibers of the adjacent top layer 16 and base layer 12 and is then quickly set by cooling. As a result, material is set in a substantially laminar film-like configuration enabling sufficient interfusion of the material into the interstices of the top layer 16 and base layer 12 to establish intimate contact between the material and the layers while avoiding excessive flowing of the material into the layers or substantial melting of the layers. Limiting melting and reforming of material in top layer 16 and base layer 12 avoids stiffening the materials so that the desired soft texture of the composite is achieved.

On the cooling roll, the entire composite is pressed by passage between one or more sets of relatively smooth nip rolls at a nip pressure of from about 50 to about 150 psi in order to bond the layers together along their interfacial areas producing a substantially continuous interbonding between layers 12, 14 and 16 as shown in FIG. 5. As used herein, "continuously bonded" or "continuously interbonded" means there is substantial fiber or material interfusion/contact at the interfaces between layers 16 and 12, respectively, and layer 14 substantially continuously along the interfaces. In the bonding of the layers, the overall caliper of the resulting composite may be decreased relative to the sum of the calipers of the individual layers.

While it is preferred to bond the base layer 12 to the top layer 16 using an intermediate bond layer 14 alone with a nip roll, adhesives may also be used in addition to or as the bond layer 14 to continuously interbond layers 12 and 16 together so long as the desired texture/stiffness is retained. Any suitable adhesives may be used to bind the layers together. However, a integral a film-like bond layer 14 is preferred to avoid significant flowing of any bonding agent into the interfiber voids of layers 12 and 16.

Overall, a composite web 10 according to the invention preferably has a total weight ranging from about 70 to about 90 pounds per 3000 square feet of composite, a thickness ranging from about 10 to about 15 mils and is substantially weather resistant and tear resistant.

With reference to FIG. 5, the dark circular areas 30 of the photomicrograph are cross-sections of individual fibers of base layer 12 shown in FIGS. 2 and 3. The continuous, relatively thin bond layer 14 is the polyolefin material extruded onto top layer 16. As can be seen, top layer 16 is considerably more dense than base layer 12, the latter of which, having substantial void space with a larger caliper, contributes to the improved overall characteristics of the composite 10.

Figure 6:
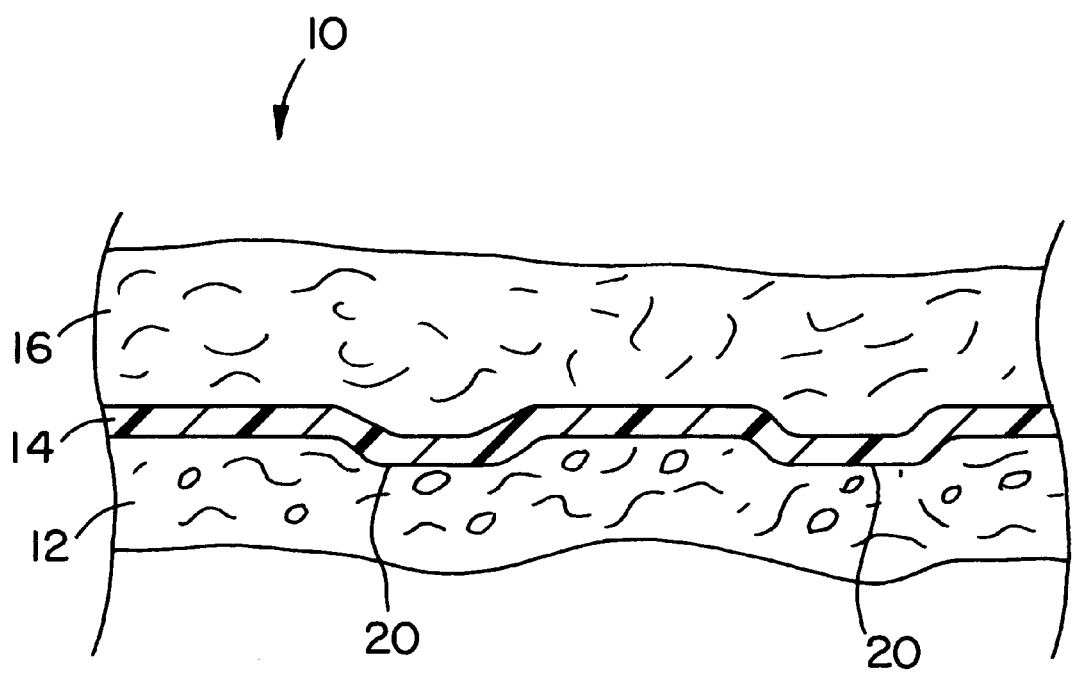
FIG. 6 is a diagramatic view, in cross section, illustrating effects concavities in the base layer have on the composite web.

One further feature of the invention illustrated in FIG. 6 relates to the effect achieved in the invention arising from use of a base layer 12 having the above-described point-bond characteristics and the associated concavities 20. As can be seen, concavities 20 in layer 12 placed adjacent bond layer 14 receive or contain material from the bond layer 14 and the top layer 16, both of which substantially deform or otherwise are caused to enter into the concavities 20. Thus, the manner of combining the layers is preferably selected to induce deformation/entry of material from bond layer 14 and top layer 16 into the concavities providing all along the interface between the adjacent layers a substantially continuous bond even in the concavities of base layer 12, with relatively little deformation of base layer 12, so that the base layer 12 remains substantially undeformed thereby retaining the advantageous texture and other properties of base layer 12 conferred by the embossing while achieving good and sufficient continuous bonds between the adjacent layers which resist layer separation and improve the strength of the composite.

The outer surface of the top layer 16 may be printed on a flexographic, an offset printer or a wide variety of inkjet, laser and dot matrix printers which are currently available. Because of its weatherability and strength, the composite is particularly suitable for use in making outdoor signs and banners.

In order to facilitate a further understanding of the invention, the following non-limiting example illustrates one or more aspects of the invention.

EXAMPLE 1

A composite web was made including one layer of synthetic pulp containing 85% by weight polyethylene pulp, 10% by weight polypropylene staple fibers and 5% by weight polyvinyl alcohol fibers. The synthetic pulp had an average fiber length of 0.9 millimeters, an average fiber diameter of 15 microns and was made from polyethylene having a density of about 0.96 grams/cm$^3$, polypropylene having density of about 0.91 grams/cm$^3$ and a size of about 2.2 denier per filament by about 10 millimeters long and polyvinyl alcohol having a size of about 2.0 denier per filament by about 5 millimeters long. Such a layer is available under the tradename POLYWEAVE from International Paper Company of Purchase, N.Y. and has a basis weight of about 44.5 pounds per 3000 square feet.

A separate non-woven layer was a spunbond layer which is commercially available from Veratec Canada, a Division of International Paper Company of Toronto, Canada under the tradename designation VERASPUN. Such a spunbond material is made from continuous polypropylene filaments having a denier of about 2.5 to about 3.0 denier per filament. The basis weight of the spunbond layer was about 21 pounds per 3000 square feet.

A layer of low density polyethylene (LDPE) was extruded onto the POLYWEAVE layer and the POLYWEAVE layer, the spunbond layer and the LDPE layer were laminated together using the nip rolls of an extrusion laminator at a line speed of about 700 feet per minute so that the final composite had a weight of about 73 pounds per 3000 square feet.

A web made by the foregoing process was tested using standard TAPPI test methods. The methods and results are given in the following table.

TABLE

| Test description | TAPPI Test Method | Value |
|---|---|---|
| Gurley Porosity (oil secs./100 cc) | T-536 OM-88 | 173 |
| Basis Weight (lb/3000 ft$^2$) | T-410 OM-93 | 69.2 |
| Caliper (mils) | T-411 OM-89 | 12.7 |
| Mullen (psi) | T-403 OM-91 | 17 |
| Elmendorff Tear (grams) | T-414 OM-88 | MD[1]-667 |
|  |  | CD[2]-853 |
| Tensile (lb/inch) | T-494 OM-88 | MD-8.49 |
|  |  | CD-5.98 |
| Elongation (%) | T-494 OM-88 | MD-12.88 |
|  |  | CD-12.43 |
| Scott Internal Bond (ft-lbf in thousandths) | T-541 OM-89 | 41 |
| Opacity | T-425 OM-91 | 95.6 |

[1] MD — machine direction
[2] CD — cross-machine direction

As shown by the foregoing example, the composite material of the invention has substantial strength in both the machine and cross-machine directions, low porosity and high opacity.

Having described the invention and preferred embodiments thereof, it will be recognized that the invention is capable of numerous modifications, rearrangements and substitutions by those of ordinary skill without departing from the spirit and scope of the invention as defined by the appended claims.

What is claimed is:

1. A synthetic paper composite web consisting essentially of a top layer comprising synthetic pulp, a base non-woven layer comprising randomly oriented interbonded polymeric filaments and a film layer disposed between the top and base layers consisting essentially of a low density polyolefin, the film layer substantially continuously interbonding the top and base layers together adjacent the interfaces between the top layer and the film and between the base layer and the film, respectively, on opposite surfaces of the film layer.

2. The composite web of claim 1 wherein the synthetic pulp and filaments comprise fibers compounds selected from the group consisting of polyethylene (PE), polypropylene (PP) and polyvinyl alcohol (PA) fibers.

3. The composite web of claim 1 wherein the polyolefin film layer comprises low density polyethylene (LDPE).

4. The composite web of claim 1 wherein the top layer has a basis weight ranging from about 38 to about 55 pounds per 3000 square feet and a caliper ranging from about 6.0 to about 8.5 mils.

5. The composite web of claim 1 wherein the synthetic pulp comprises about 85% by weight polyethylene fibers, about 10% by weight polypropylene staple fibers and about 5% by weight polyvinyl alcohol fibers.

6. The composite web of claim 1 wherein the polyolefin layer is a film having a basis weight ranging from about 5 to about 15 pounds per 3000 square feet and a relatively uniform thickness in the range of from about 0.2 to about 1 mil.

7. The composite web of claim 1 further comprising a coating on the top layer selected from the group consisting of clay, inkjet and laserjet coatings.

8. The composite web of claim 1 wherein the non-woven layer is a spunbond layer having a basis weight ranging from about 15 to about 25 pounds per 3000 square feet and a caliper ranging from about 10 to about 14.5 mils.

9. The composite web of claim 1 wherein the base layer includes a plurality of relatively small, spaced apart concavities on its surface adjacent the polyolefin layer and the polyolefin and top layers are deformed into the concavities in bonding association therewith.

10. A synthetic composite web which comprises a top layer of polymeric pulp, a base layer of spunbond fibers disposed adjacent the top layer having a plurality of relatively small spaced apart concavities on its surface facing the top layer and a layer disposed between the top and base layers consisting essentially of a low density polyethylene substantially continuously interbonding the top and base layers together wherein the polyolefin and base layers are disposed in said concavities.

11. The composite web of claim 10 wherein the polymeric pulp comprises polyethylene (PE) fibers, polypropylene (PP) fibers and binder fibers.

12. The composite web of claim 11 wherein the PE fibers in the pulp comprise from about 80 to about 90% by weight of the pulp.

13. The composite web of claim 12 wherein the PP fibers in the pulp comprise from about 4 to about 11% by weight of the pulp.

14. The composite web of claim 13 wherein the binder fibers comprise from about 4 to about 6% by weight of the pulp.

15. The composite web of claim 10 wherein the top layer has a basis weight of from about 43 to about 51 pounds per 3000 square feet and a caliper ranging from about 6.0 to about 8.5 mils.

16. The composite web of claim 10 wherein the polyethylene layer is a film having a basis weight ranging from about 5 to about 15 pounds per 3000 square feet and a relatively uniform thickness in the range of from about 0.2 to about 1 mil.

17. The composite web of claim 10 further comprising a coating on the top layer selected from the group consisting of clay, inkjet and laserjet coatings.

18. The composite web of claim 10 wherein the base layer has a basis weight ranging from about 15 to about 25 pounds per 3000 square feet and a caliper ranging from about 10.0 to about 14.5 mils.

* * * * *